(12) United States Patent
Belliveau

(10) Patent No.: US 6,570,348 B2
(45) Date of Patent: May 27, 2003

(54) APPARATUS FOR DIGITAL COMMUNICATIONS WITH MULTIPARAMETER LIGHT FIXTURES

(76) Inventor: Richard S. Belliveau, 10643 Floral Park, Austin, TX (US) 78759

( * ) Notice: Subject to any disclaimer, the term of this patent is extended or adjusted under 35 U.S.C. 154(b) by 0 days.

(21) Appl. No.: 10/231,823

(22) Filed: Aug. 29, 2002

(65) Prior Publication Data

US 2003/0001523 A1 Jan. 2, 2003

Related U.S. Application Data

(60) Continuation of application No. 10/002,708, filed on Nov. 1, 2001, now Pat. No. 6,459,217, which is a division of application No. 09/394,300, filed on Sep. 10, 1999, now Pat. No. 6,331,756.

(51) Int. Cl.[7] .............................................. H05B 37/00
(52) U.S. Cl. ........................ 315/315; 315/316; 315/317
(58) Field of Search ................................. 315/315, 316, 315/317, 312

(56) References Cited

U.S. PATENT DOCUMENTS

| | | |
|---|---|---|
| 3,706,914 A | 12/1972 | Van Buren |
| 3,898,643 A | 8/1975 | Ettlinger |
| 4,095,139 A | 6/1978 | Symonds et al. |
| 4,697,227 A | 9/1987 | Callahan |
| 4,980,806 A | 12/1990 | Taylor et al. |
| 5,828,485 A | 10/1998 | Hewlett |
| 6,388,399 B1 * | 5/2002 | Eckel et al. ................ 315/312 |

OTHER PUBLICATIONS

Carlson, Steven B., A Guided Tour of DMX512, ROXCO/Entertainment Technology, Mar. 25, 1996.
High End Systems, Inc., High End Systems Product Line, 1996.
Clay Paky Light Dimension, Golden Scan: The absolute winner, in Light Dimensions, Dec. 1988.
Electronic Theatre Controls, Inc., Sensor CEM Dimming System User Manual, Version 2.14, 1996.
Electronic Theatre Controls, Inc., Sensor CEM Dimming System User Manual, Version 3.0, 1998.

* cited by examiner

Primary Examiner—David Vu
(74) Attorney, Agent, or Firm—Dorsey & Whitney LLP

(57) ABSTRACT

A typical light fixture is an integral unit that has a lamp assembly and a communications node to control the lamp assembly. Lighting systems contain many such light fixtures. One type of lighting system has at least two communications systems that interconnect the light fixtures. A digital controller is connected to one of the communications systems, at least one of the light fixtures of that communications system is a designated gateway for sending control signals to the other communications system. Another type of lighting system has two digital controllers connected to respective communications systems. Each of the communications systems interconnects many light fixtures, at least one of which has two communications nodes respectively connected to the communications systems. A third type of lighting system mixes combines the first and second types.

9 Claims, 7 Drawing Sheets

APPARATUS FOR DIGITAL COMMUNICATIONS WITH MULTIPARAMETER LIGHT FIXTURES

CROSS-REFERENCE TO RELATED APPLICATION

The present application is a continuation of co-pending application Ser. No. 10/002,708, filed Nov. 1, 2001 now U.S. Pat. No. 6,459,217 which is a division of nonprovisional application Ser. No. 09/394,300, filed Sep. 10, 1999, and issued at U.S. Pat. No. 6,331,756 on Dec. 18, 2001, which are incorporated herein by reference thereto in their entirety, as though fully set forth herein.

BACKGROUND OF THE INVENTION

1. Field of the Invention

The present invention relates to digital control of lighting devices, and more particularly to digital control of large lighting systems, including systems having multi-parameter light fixtures, with multiple communications systems.

2. Description of Related Art

Multi-parameter light fixtures, which include light fixtures having individually remotely adjustable beam size, color, shape, angle, and other light characteristics, are widely used in the lighting industry because they facilitate significant reductions in overall lighting system size and permit dynamic changes to the final lighting effect. Applications and events in which multi-parameter light fixtures are used to great advantage include showrooms, television lighting, stage lighting, architectural lighting, live concerts, and theme parks.

In practice, the multi-parameter light fixtures of a system are typically controlled by a central controller. Prior to the advent of relatively small commercial digital computers, remote control of light fixtures from a central controller was done with either a high voltage or low voltage current; see, e.g., U.S. Pat. No. 3,706,914, issued Dec. 19, 1972 to Van Buren, and U.S. Pat. No. 3,898,643, issued Aug. 5, 1975 to Ettlinger. With the widespread use of computers, digital serial communications was widely adopted as a way to achieve remote control; see, e.g., U.S. Pat. No. 4,095,139, issued Jun. 13, 1978 to Symonds et al., and U.S. Pat. No. 4,697,227, issued Sep. 29, 1987 to Callahan.

Digital communications between the central controller and the multi-parameter light fixtures typically is by wire. In 1986, the United States Institute of Theatre Technology ("USITT") developed a digital communications system protocol for multi-parameter light fixtures known as DMX512. While the DMX512 protocol has been updated several times since its adoption, the basic communications protocol remains the same. Basically, the DMX512 protocol consists of a stream of data which is communicated one-way from the control device to the light fixture using an Electronics Industry Association ("EIA") standard for multipoint communications know as RS-485. FIG. 1 shows an illustrative system based on the USITT DMX512 protocol. Power mains 12 provide AC power to a central controller 10 and light fixtures 20, 22, 24, 26, 32, 34 and 36 over standard building electrical wiring 14. A communications cable 16 is run from the central controller 10 to the first multi-parameter light fixture 20, and additional communication cable segments 21, 23, 25, 31, 33 and 35 sequentially connect the light fixtures 22, 24, 26, 32, 34 and 36. While only seven multi-parameter light fixtures are shown in FIG. 1 for clarity, typically multi-parameter lighting systems may have thirty or more such light fixtures. Communication is in a single direction, as shown by arrows adjacent the communications cable 16 and cable segments 21, 23, 25, 31, 33 and 35. From time to time, light fixtures must be placed in locations which are hard to reach or otherwise present difficulties during installation and cabling. A hard to reach or difficult area 30 containing light fixtures 32, 34 and 36 is included in FIG. 1.

An illustrative light fixture 100 suitable for use in the multi-parameter lighting system of FIG. 1 is shown in greater detail in FIGS. 2 and 3. The front view of FIG. 2 shows a light housing 110 which is rotatably attached to a yoke 108. The yoke 108 is in turn rotatably attached to an electronics module 104, which contains a power supply and communications and control electronic circuits. A panel area 106 on the electronics module 104 contains a display and various buttons for manually setting the operating address of the light fixture 100. The side view of FIG. 3 shows that the electronics module 104 also includes a pair of digital communications terminals, one of which is a digital input terminal 112 designated DIGITAL LINE IN and the other of which is a digital output terminal 114 designated DIGITAL LINE OUT. Internally, the input terminal 112 typically is looped through to the output terminal 114. Respective communications cables plug into the terminals 112 and 114. A line cord 102 for connecting the multi-parameter light fixture 100 to the power line extends from the electronics module 104. Illustrative multi-parameter light devices are described in the product brochure entitled The High End Systems Product Line 1996 and are available from High End Systems, Inc. of Austin, Tex.

To maintain reliability throughout the multi-parameter lighting system, the communications cables typically are dedicated metallic or fiber optic cables. One reason is the central controller for the multi-parameter light fixtures of a system may be a considerable distance from the light fixtures. For example, central controllers may be located over one hundred meters from the light fixtures they control in such places as large arenas, theaters, and auditoriums. Lengthy cable runs are also found in commercial buildings in which light fixtures are used for architectural lighting, since the communications cables must pass from floor to floor or between widely separated rooms on the same floor. Moreover, a typical large lighting system contains over thirty light fixtures and a corresponding number of communications cables between the light fixtures, and requires significant labor to connect securely each of the light fixtures and the central controller to the power mains and their respective communications cables. Installation of multi-parameter lighting systems tend to be quite costly, taking into consideration the individual costs of the cables, the associated connectors, and the labor involved in installing them.

During the transition from analogue control to digital control, some multi-parameter light fixtures were constructed with both a digital and an analog means of communication. An example of such a device is the TrackSpot® automated luminaire, which is described in the product brochure entitled The High End Systems Product Line 1996 and is available from High End Systems Inc. of Austin, Tex. The TrackSpot system has a wide variety of control options, including digital and analog. The analog communication is designed as an input, and the device is manually selectable between the digital and analog input schemes. The analog communication to the device controls the device that it is connected to, whereas the digital communications "loops through" from light to light with an addressable signal scheme for controlling multiple addressed light fixtures.

The TrackSpot fixture is physically switched on the fixture to assume either a master or a slave position. With the fixture set to the master position, an analog signal at the analog input to the fixture causes the master to execute a particular one of numerous memory resident programs based on the analog value it receives. The master also sends a digital signal to the other fixtures that are set up as "slaves" to cause them to act on their respective memory resident programs.

Despite advances in the control of large lighting systems, a need exists for improving the digital control of large systems that include multi-parameter light fixtures.

SUMMARY OF THE INVENTION

Accordingly, an object of the present invention as realized in particular embodiments is to reduce the cost of installing and dismantling complex lighting systems generally, and multi-parameter lighting systems particularly.

Another object of the present invention as realized in particular embodiments is to provided a multi-parameter light fixture that supports multiple levels of communications for controlling complex lighting systems generally, and multi-parameter lighting systems particularly.

Yet another object of the present invention as realized in particular embodiments is to extend the capabilities of complex lighting systems generally, and multi-parameter lighting systems particularly, while maintaining essential core reliability.

These and other objects are achieved in the various embodiments of the present invention. For example, one embodiment of the present invention is a multi-parameter light fixture comprising a lamp assembly comprising a plurality of parameters, an addressable first digital communications node, and an addressable second digital communications node. The first digital communications node is networkable in a first external communications system and has a first control output coupled to the lamp assembly for controlling at least one of the parameters. The second digital communications node is networkable in a second external communications system and has a second control output coupled to the lamp assembly for controlling at least one of the parameters.

Another embodiment of the present invention is a multi-parameter light fixture comprising a lamp assembly comprising a plurality of parameters, including a video projection parameter, an addressable first digital communications node, and an addressable second digital communications node. The first digital communications node is networkable in a DMX communications system and has a control output coupled to the lamp assembly for controlling at least one of the parameters. The second digital communications node is networkable in a second external communications system that is compliant with a protocol that supports video information, and has a control output coupled to the lamp assembly for controlling at least the video projection parameter.

DETAILED DESCRIPTION OF THE PREFERRED EMBODIMENT

Figure 1:
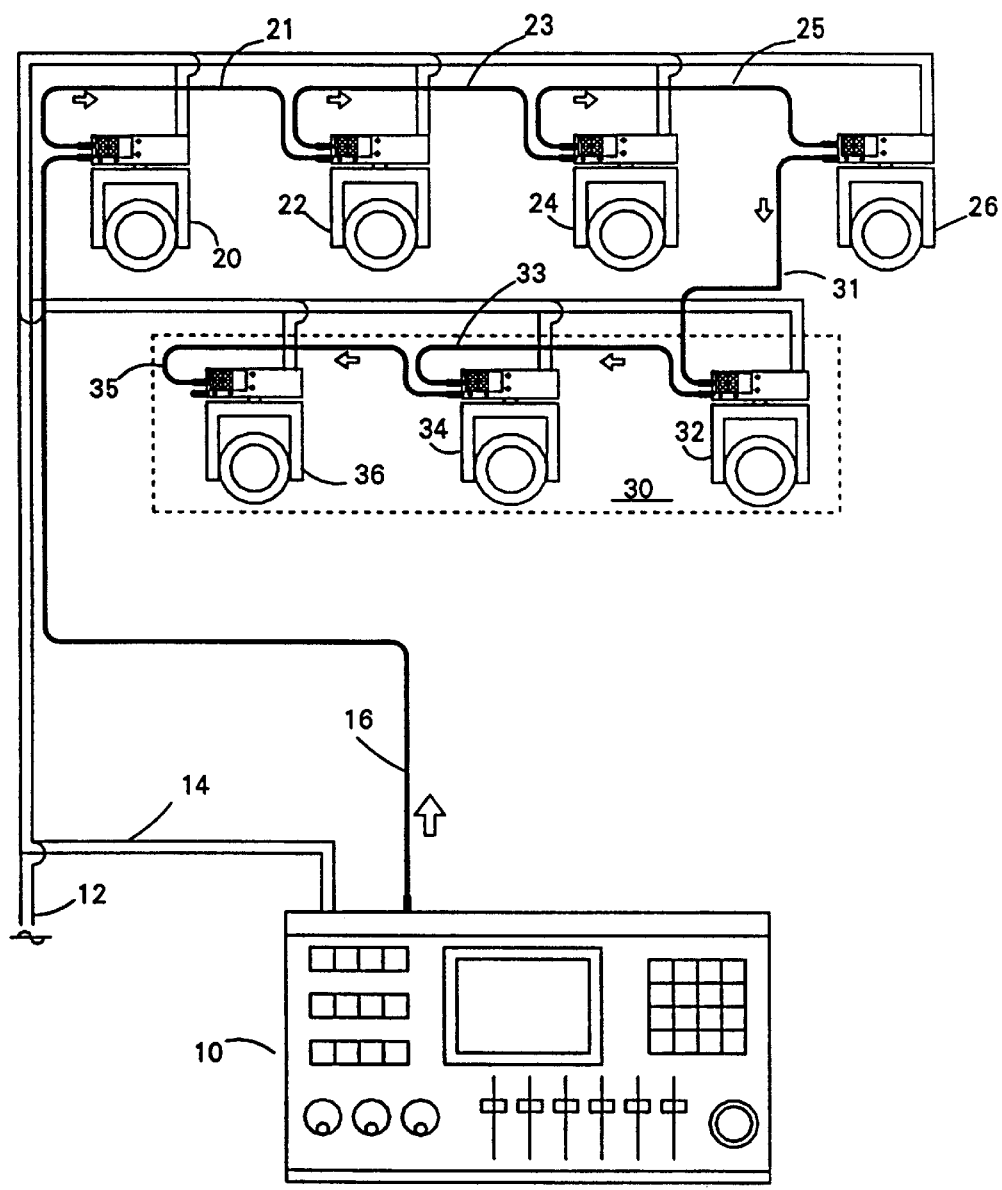
FIG. 1 is a schematic diagram of a prior art lighting system.
Figures 2, 3:
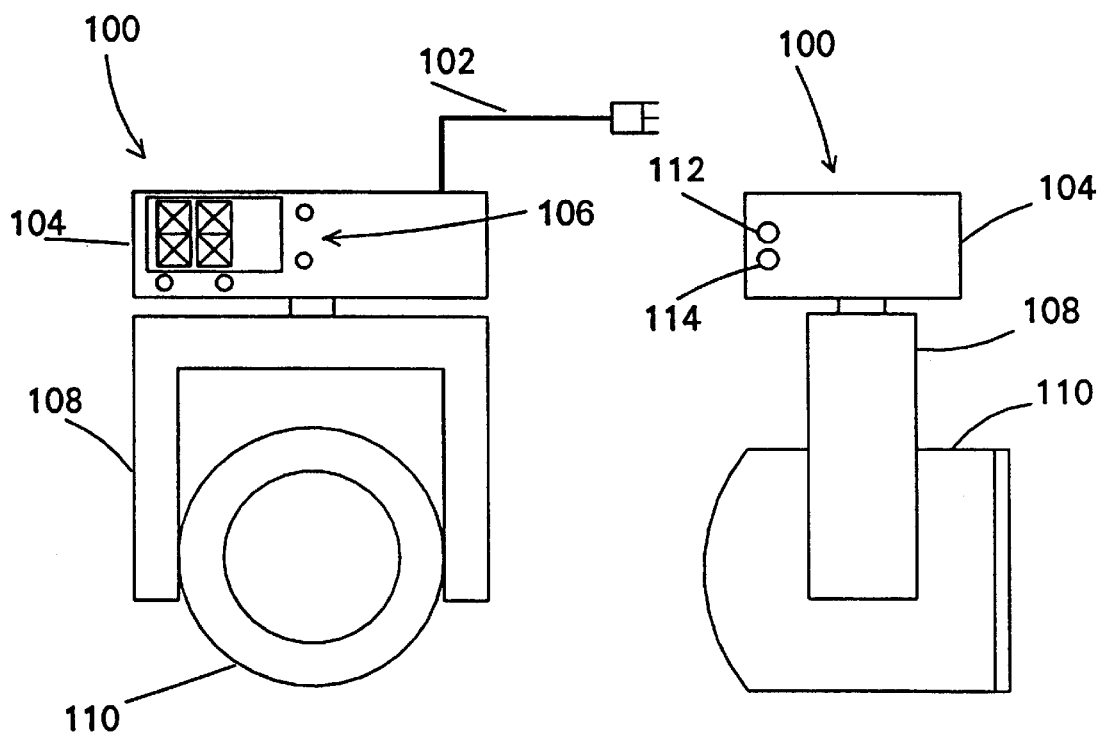
FIG. 2 is a plan front view of a multi-parameter light fixture.
FIG. 3 is a plan side view of the multi-parameter light fixture of FIG. 2.
Figure 4:
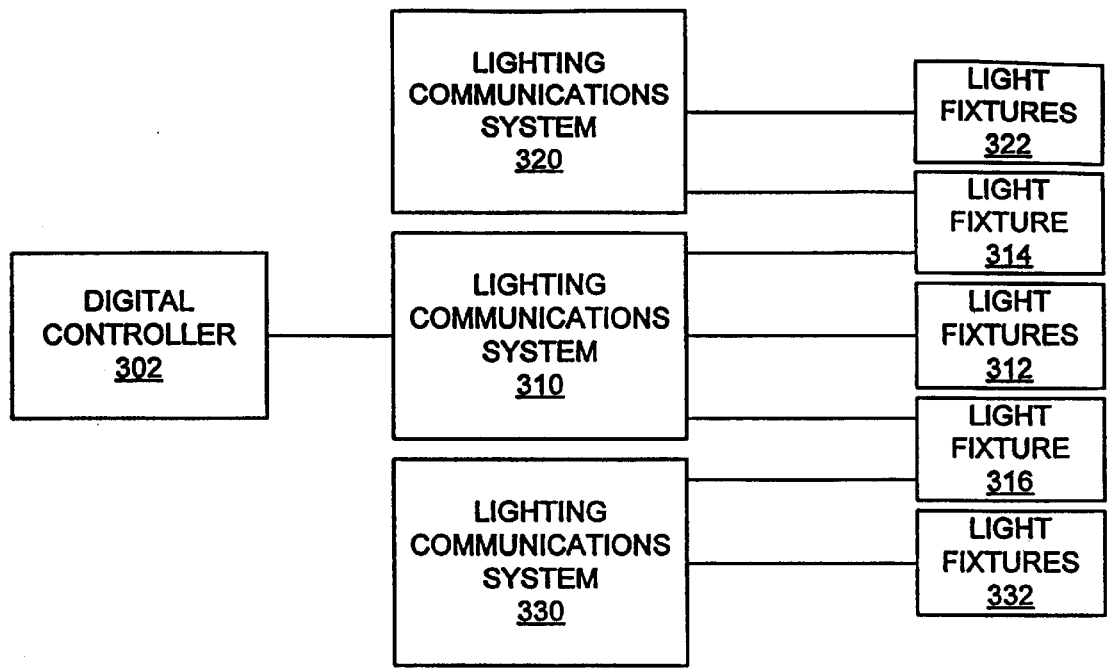
FIG. 4 is a block schematic diagram of a lighting system having communications systems in accordance with the present invention.
Figure 5:
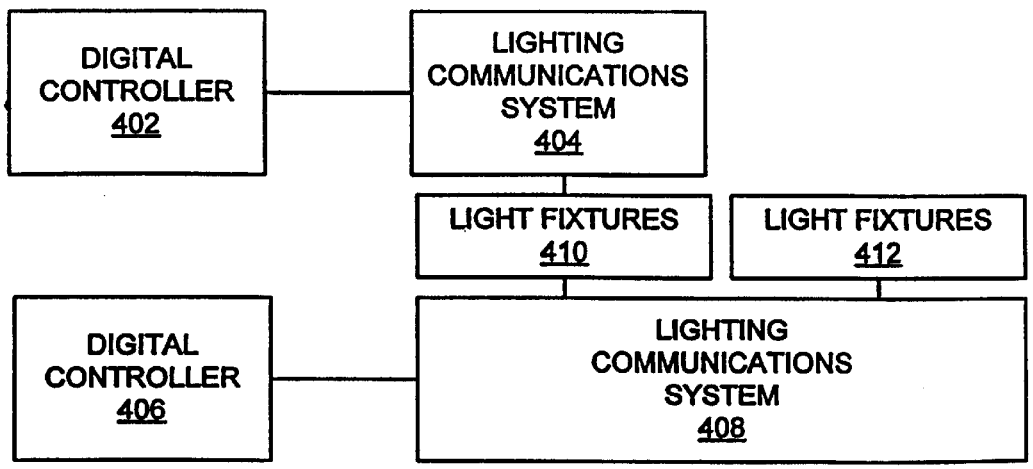
FIG. 5 is a block schematic diagram of another lighting system having communications systems in accordance with the present invention.

Lighting systems that include multi-parameter light fixtures and multiple digital communications systems are generally characterized by FIG. 4, by FIG. 5, or by a combination of FIGS. 4 and 5. These systems include digital controllers (controller 302 in FIG. 4 and controllers 402 and 406 in FIG. 5) which issue digital commands recognizable by nodes in the system that control the light effects, and which communicated using any suitable protocol such as a one way communications protocol, the DMX512 protocol for example, or a bi-directional communications protocol. A multi-parameter light fixture is an integral unit that includes a lamp assembly and one communications node, or an integral unit that includes a lamp assembly and two or more communications nodes, or an integral unit that includes a lamp assembly, two or more communications nodes, and a gateway circuit or circuits between the communications nodes. The communications nodes of a multi-parameter light fixture reside in the fixture and are part of it. A lamp assembly for a multi-parameter light fixture includes a lamp, typically but not necessarily a high intensity lamp, and one or more other components such as, but is not limited to, the following: motors, filters, lenses, prisms, gobo wheels, shutters, iris diaphragms, and circuits for achieving optical effects such as frost and diffusion, zoom and focus, pan and tilt, iris, independent or interactive three color effects, and rotating and static gobo patterns.

Generally, a gateway is any electronic circuit that permits signals to pass between communications systems either unidirectionally or bi-directionally. Gateways may or may not perform protocol conversion, depending on whether the communications systems operate on different communications protocols. Suitable gateway circuits and protocol converters are well known in the electronic circuit arts.

The lighting system of FIG. 4 illustratively has three lighting communications systems 310, 320 and 330. A digital controller 302 is connected to the communications system 310 and light fixtures 312, 314 and 316 are interconnected by the communications systems 310 in any suitable way. Light fixtures 314 and 322 are interconnected by the communications systems 320 in any suitable way. Light fixtures 316 and 332 are interconnected by the communications systems 330 in any suitable way. Some light fixtures include gateways between two or more of the communications systems, through which at least some of the control signals from the communications system 310 are furnished to the communications systems 320 and 330. For example, light fixture 314 includes a gateway circuit (not shown) between the communications systems 310 and 320, and is controllable from the communications system 310.

Similarly, light fixture 316 includes a gateway circuit (not shown) between the communications systems 310 and 330, and is controllable from the communications system 310. While FIG. 4 shows only one gateway installed between different communications systems, more than one gateway may be installed between different communications systems if desired. While FIG. 4 shows three lighting communications systems 310, 320 and 330, the use of only two or three or more communications systems is contemplated.

In the lighting system of FIG. 5, the digital controller 402 is connected to lighting communications system 404 and light fixtures 410 are interconnected by the communications systems 404 in any suitable way. The digital controller 406 is connected to lighting communications system 408 and light fixtures 410 and 412 are interconnected by the communications systems 408 in any suitable way. Some light fixtures such as light fixtures 410 are controllable from both of the lighting communications systems 404 and 408. If desired, any of the light fixtures 410 may be provided with gateways to enable communications between communications systems 404 and 408. While FIG. 5 shows two lighting communications systems 404 and 408, the use of two or more communications systems is contemplated.

Preferably, one of the lighting communications systems and its interconnection to a digital controller has high reliability, which is achieved by using reliable and securely installed electrical or optical physical cables and connectors. For example, in FIG. 4 the digital controller 302 and the lighting communications system 310 use high reliability digital communications, and in FIG. 5 the digital controller 402 and the lighting communications system 404 use high reliability digital communications. Other lighting communications systems in the lighting system may be of low reliability or a mix of high and low reliability, as desired, and may use various communications techniques depending on project budget and site characteristics. Power line communications and wireless communications such as radio frequency and infrared are particularly useful where physical access is difficult or when installation time is limited.

Suitable wired communications systems include parallel or serial bus, in series wiring, star ring network, FDDI ring network, token ring network, and so forth. Suitable wired communications protocol include the DMX512 protocol for unidirectional communications over conductors, and the CEBus (Consumer Electronics Bus) Standard EIA-600 for communications over a power line. If bidirectional communications is desired using the DMX512 protocol, additional conductors and suitable interface electronics for full duplex are used, since the DMX512 protocol does not support bidirectional communications over the same conductors. Suitable wireless communications systems include radio frequency and infrared. Suitable wireless communications protocols include the previously mentioned CEBus Standard, which also applies to RF and infrared communications.

Having two or more communications systems available in a multi-parameter lighting system enables the system designer to optimize individual communications systems as required. A multi-parameter light fixture communicating over a first lighting communications system may act as a gateway to supply commands to multi-parameter light fixtures communicating over a second lighting communications system. Although the second communications system may be of the same type as the first, preferably the second communications system is of a different type. Where the first communications system is a cable based system, for example, the second system may be a wired or wireless communications system and may have greater speed or another performance advantage or ease of installation or other capability that the first system does not have. For example, a second communications system may conform to the ANSI/EIA-600 protocol used for the CEBus. Light fixtures conforming to this protocol would be compatible with and could be controlled from other devices conforming to the ANSI/EIA-600 protocol if desired.

The use of a multi-parameter light fixture acting as a gateway from one communications system to another different communications system may be better understood from the following example. A multi-parameter light fixture resident on a first communications system receives and preferably performs an operation in accordance with commands from a particular command set. If the multi-parameter light fixture is also a gateway, it retransmits those commands on one or more additional communications systems on which it is also resident. The other multi-parameter light fixtures on the additional communications systems participate in the operation, if so commanded. Where different protocols are used for the different communications systems, the gateway multi-parameter light fixture includes a communications converter. The containment of a communications converter at the gateway multi-parameter light fixture adds negligible additional complexity to many of the commercially available multi-parameter light fixtures that contain microprocessor systems, since the programs operating the microprocessors are easily modified to forward the commands to the appropriate terminals of the light fixtures and to perform any needed conversion from one communications system to another at any desired location.

A gateway may function in any one of a number of ways with respect to the light fixtures linked to it. One simple and flexible technique is for the gateway in a multi-parameter lighting fixture to pass all signals received on one of its connected lighting communications systems on to the other one or more of its connected lighting communications systems, with or without protocol conversion as necessary. If the command is addressed to the gateway multi-parameter lighting fixture, the fixture responds to the command; otherwise, the command is ignored. It will be appreciated that other gateway techniques may be used, if desired. As a further example, the command set may include mode commands that switch the addressed gateway multi-parameter light fixture into a desired mode, such as a pass through mode. These techniques, permutations of these techniques, and other suitable techniques as desired may be used to implement the gateway.

A multi-parameter light fixture on a first communications system acting as a gateway to a second communications system may also be designed to respond to commands on the second communications system originating from, for example, a second controller; see FIG. 5. A multi-parameter light fixture may also be designed to act as a gateway in either direction, that is as a gateway from a first communications system to a second communications system as well as a gateway from the second communications system to the first communications system.

In a lighting system such as shown in FIG. 4 having two or more communications systems, two or more gateways may be installed between different communications systems. The selection of which gateway to make active is accomplished by any suitable technique. Simple techniques involve a human operator physically setting a switch on one of the gateway multi-parameter light fixtures to activate its gateway function, or issuing a command from the digital controller to select a particular one of the gateway multiparameter light fixtures and activate its gateway function. A more complicated but preferable technique is the intelligent arbitration of the nodes in the installation.

In intelligent arbitration, light fixtures connected into both a first lighting communications system and a second lighting communications system automatically decide amongst themselves which is to act as a gateway to the light fixtures receiving communications only from the second communications system. Methods of intelligent arbitration are well known and may be used amongst multi-parameter light fixtures to decide which light fixture receiving communications from the first and second communications system should act as a gateway. Only one of the light fixtures should act as a gateway to transmit command sets from the first to the second communications system to avoid collisions. Multi-parameter light fixtures used in an installation are provided with unique operating addresses so that each light may receive and decode its individual commands. One way to provide this operating address is for installation personnel to manually set the address at the light fixture using switches incorporated into the light fixture. In addition, multi-parameter light fixtures typically contain a unique manufacturing address, which is different for each light fixture and is used by service personnel to address the light in a group during the loading of new operating software. Other well-known address assignment techniques may be used if desired.

In a lighting system such as shown in FIG. 5 having two or more communications systems with respective controllers, multi-parameter light fixtures may be connected to multiple communications systems, either of which may affect light fixture parameters and operations such as homing and enabling or disabling operational modes. In this event, the multi-parameter light fixtures connected to multiple communications systems select which one of the communications systems to respond to using any suitable priority system. For example, automatic selection by the priority system may be predisposed by programming at the factory or may be selected at the multi-parameter light fixture itself by manual entry at the keypad, in a manner well known in the art. The priority system allows the multi-parameter light fixture to select which communications system may provide certain operating commands if the commands are duplicated by multiple systems. For example, the multi-parameter light fixtures connected to multiple communications systems should respond to operating commands such as "lamp on," "color change," "pattern change," "position," "shutter," "dimmer," "image rotate," and so forth only if from the priority system (when multiple communications systems are active), and should ignore similar or even identical commands present on another active communications system. Some commands that may be carried on the second communications system may not conflict with commands on the first communications systems, and these should be recognized and executed by the multi-parameter light fixtures connected to multiple communications systems. For instance, requests for service information presented over the second communications system should be responded to regardless of whether the first or second communications system is the priority system.

In the event that only one communications system of the lighting system is active, such as, for example, during light system installation or when one of the communications systems fails, the light fixtures in the lighting system should respond to the active communications system. For example, in a lighting system having two communications systems and two controllers, a first communications system connected to a first controller may be provided because light fixtures on the first communications system have features that benefit from the speed or bi-directional capability or other capabilities of the first communications system, while the second communications system connected to a second controller may be provided because light fixtures on the second communications system lack some of the features of the light fixtures on the first communications system and the second controller handles the transmission of the limited number of parameters to the light fixtures in the second communications system. The light fixtures on the first communications system may be interconnected in the second communications system, especially if the second controller provides a capability such as requests for service information that the first controller does not provide. When both communications systems are active, the light fixtures operate using the shared resources and respond based on priority. When only one communications system is active, the light fixtures in the lighting system preferably use the active communications system to the full extents of its capabilities. This is done at the multi-parameter light fixture by recognizing that only one communications system is active and automatically switching its operation to take fullest advantage of the active communications system.

The absence of commands on a communications system may be detected in a variety of ways. For example, if the communications system protocol is DMX, which operates using a continuous stream of data, then absence of any data at the communications port signifies that no connection is available or no data is available to this communications port. If the protocol is not DMX but instead a protocol that provides for updates to be sent only as needed, one illustrative technique for detecting a communications failure would be to have the protocol specify a minimum number of periodic updates to be given during a specified period. If at least the minimum number of updates are received within the "expected time frame," then communications at the communications port is considered active.

Figure 6:
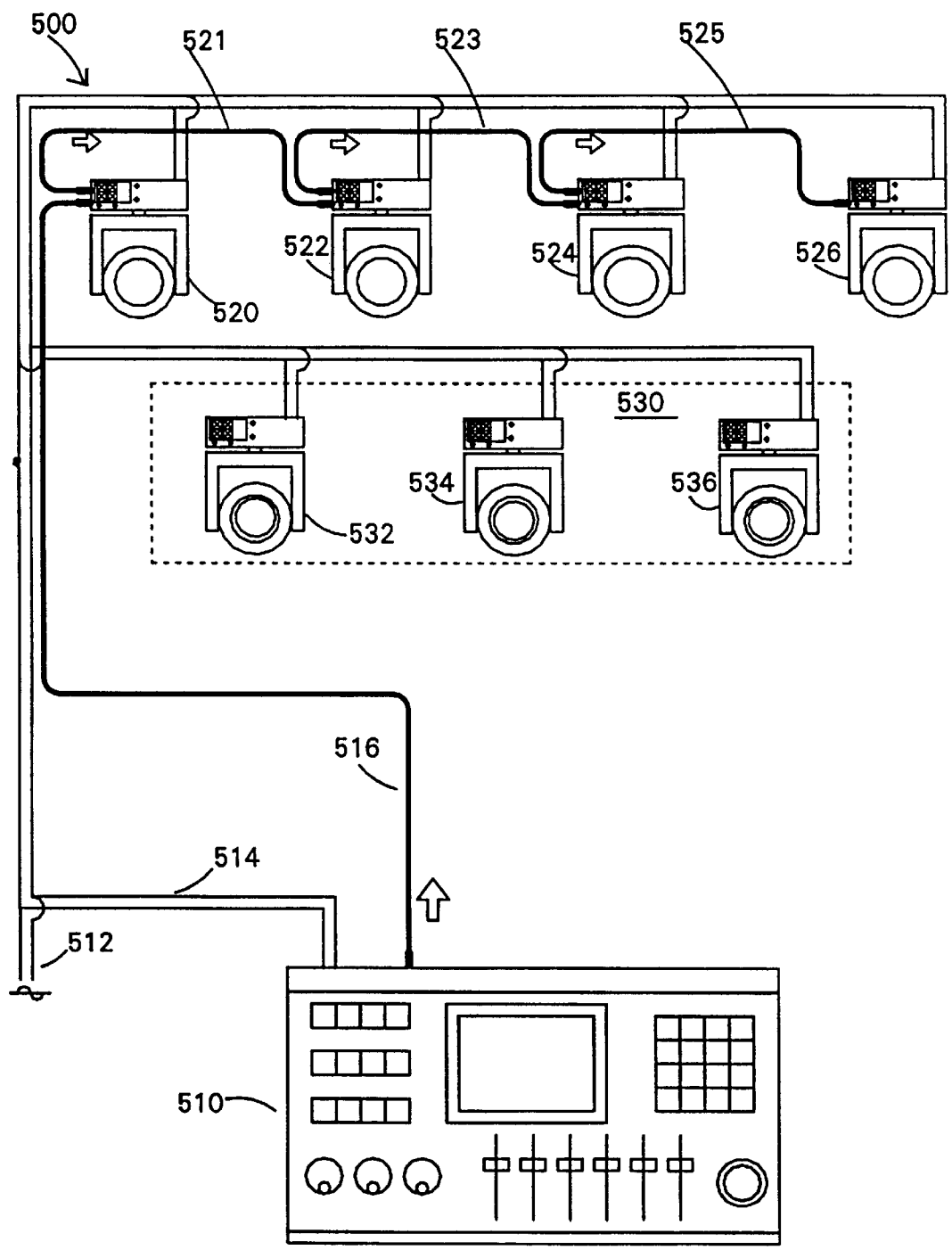
FIG. 6 is a schematic diagram of lighting system having a cable communications system and a power line communications system, in accordance with the present invention.

FIG. 6 shows a multi-parameter lighting system 500 that uses a cable communications system and a power line communications systems acting together to control multi-parameter light devices. When using a power line or radio frequency communications system, multi-parameter light fixtures are easy to install since dedicated communications cables need not be run. This is an advantage for shows that have to be constantly set up and dismantled. A considerable cost savings is realized, since the cost associated with the labor needed to run the communications cables (some in very difficult locations) as well as the cost of the cables themselves are avoided. As shown in FIG. 6, power mains 512 provide AC power to a central controller 510 and light fixtures 520, 522, 524, 526, 532, 534 and 536 over standard building electrical wiring 514. While only seven multi-parameter light fixtures are shown in FIG. 6 for clarity, typically multi-parameter lighting systems have thirty or more such light fixtures. A communications cable 516 is run from the central controller 510 to the first multi-parameter light fixture 520, and additional communications cable segments 521, 523 and 525 sequentially connect the light fixtures 522, 524 and 526. Illustratively, the DMX512 protocol is used, and the light fixtures 520, 522, 524 and 526 have communications cable interfaces of a type well known in the art. Light fixtures 532, 534 and 536, which are located in a hard to reach or difficult area 530, are provided with power line communications interfaces rather than cable communications interfaces. Illustratively, the CEBus protocol is used. One of the light fixtures 520, 522, 524 and 526, illustratively the light fixture 520, is designed as a master and is provided with a power line communications interface in addition to a communications cable interface. The light fixture 520 either initiates a new set of commands to the light fixtures 532, 534 and 536 as a function of the command it receives, or alternatively passes commands from the cable communications system to the power line communications system. Depending on the protocol used in the second communications system, the light fixture may or may not reformat the commands and data between the cable and power line communications systems. Advantageously, running communications cables to the multi-parameter lights in the hard to reach or difficult area 530 is unnecessary, and light fixtures are easily installed wherever they are needed, provided only that a power mains connection can be made.

Figure 7:
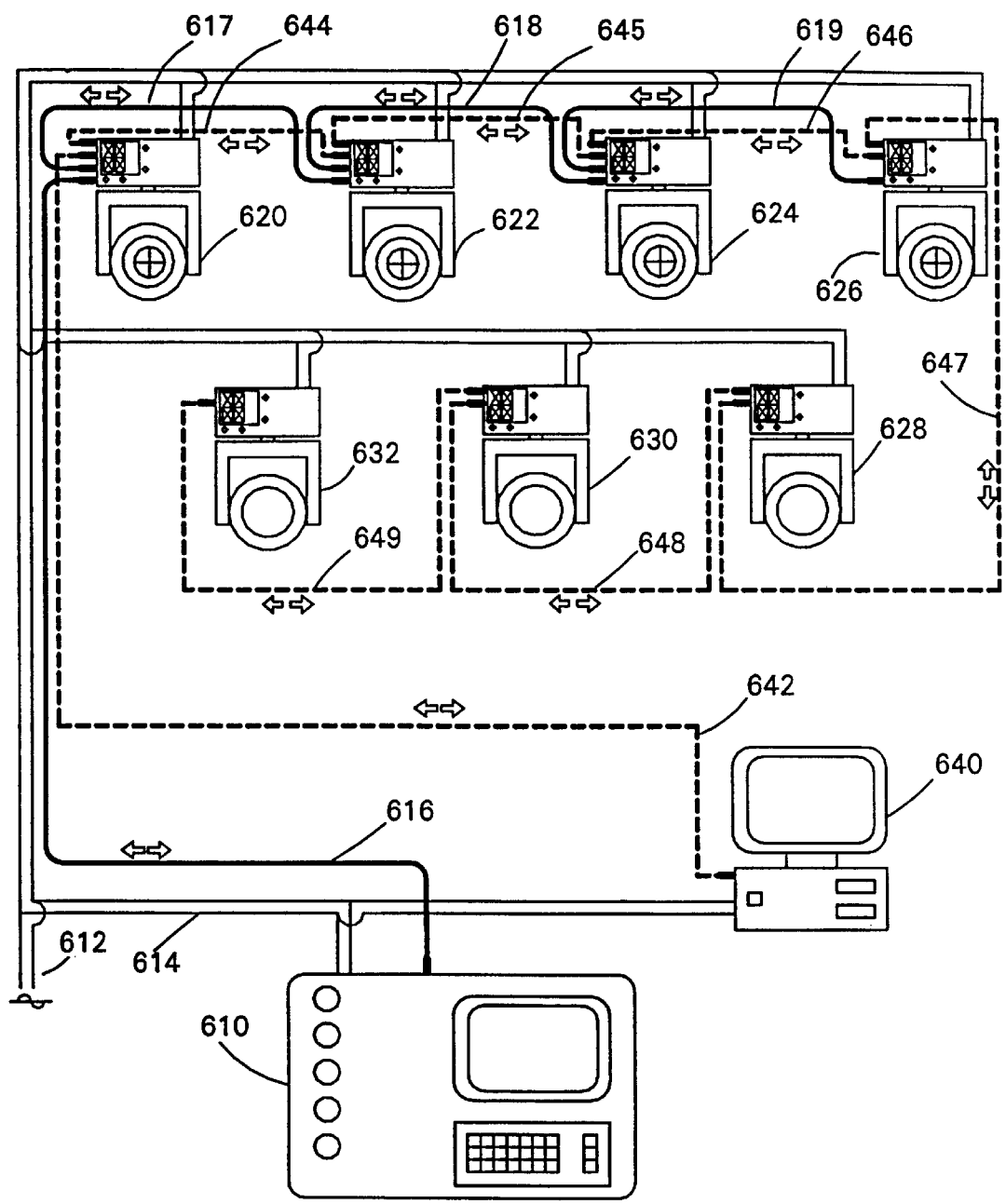
FIG. 7 is a schematic diagram of lighting system having two communications systems with respective controllers, in accordance with the present invention.

An example of a dual controller lighting system is shown in FIG. 7. Power mains 612 provide AC power to a controller 610 and light fixtures 620, 622, 624, 626, 628, 630 and 632 over standard building electrical wiring 614. While only seven multi-parameter light fixtures are shown in FIG. 7 for clarity, typically multi-parameter lighting systems have thirty or more such light fixtures. A first communications system includes communications cable 616, which runs from the controller 610 to the first multi-parameter light fixture 620, and additional communications cable segments 617, 618 and 619, which sequentially connect the light fixtures 622, 624 and 626. The light fixtures 620, 622, 624 and 626 are of any desired multi-parameter type, including, for example, such advanced types as disclosed in U.S. Pat. No. 5,828,485 entitled "Programmable light beam shape altering device using programmable micromirrors" having a variety of advanced features such as video projection. The controller 610 is also of an advanced type capable of providing a command set having not only commands typical to standard multi-parameter light fixtures, but also having commands containing video, pixel and other suitable information for the advanced features. An advanced controller 610 supports bidirectional communications compliant with a suitable protocol designed to control lights that use complex image projection such as that disclosed in U.S. Pat. No. 5,828,485, as shown by arrows adjacent communications cable 616, and the multi-parameter light fixtures 620, 622, 624 and 626 have suitable communications cable interfaces of a type well known in the art. Power mains 612 also furnish power to another controller, illustratively a computer 640. A second communications system includes communications cable 642, which runs from the computer 640 to the first multi-parameter light fixture 620, and additional communications cable segments 644, 645, 646, 647, 648 and 649, which sequentially connect the light fixtures 622, 624, 626, 628, 630 and 632. The light fixtures 628, 630 and 632 are any desired multi-parameter type such as, for example, the Studio Color automated wash luminaire available from High End Systems, Inc. of Austin, Tex., and described in the aforementioned High End Systems Product Line 1996 brochure. The computer 640 is capable of gathering service information from preferably all of the light fixtures 620, 622, 624, 626, 628, 630 and 632, and is capable of controlling parameters of preferably the light fixtures 628, 630 and 632. If desired, the computer 640 may be made capable of controlling at least some of the parameters of the light fixtures 620, 622, 624 and 626, and may additionally be made capable of controlling any parameters not controlled by the advanced controller 610. The computer 640 supports bi-directional communications, as shown by an arrow adjacent communications cable 642, and the multi-parameter light fixtures 620, 622, 624, 626, 628, 630 and 632 have suitable communications cable interfaces of a type well known in the art.

Multi-parameter light fixtures 620, 622, 624 and 626 are connected to both of the communications systems, either one of which may affect light fixture parameters and operations such as homing and enabling or disabling operational modes. In this event, the multi-parameter light fixture selects which one of the communications systems to respond to using any suitable priority system.

The selection of which light fixture connected to both the first and second communications systems should act as a gateway to the second communications system preferably is accomplished by intelligent arbitration, by which multi-parameter light fixtures arranged in groups—for example, one group (light fixtures 620, 622, 624 and 626) receiving communications from the first and second communications system and another group (light fixtures 628, 630 and 632) receiving communications only from the second communications system—automatically decide amongst themselves which light fixture of the group receiving communications from the first and second communications system is to act as a gateway to the light fixtures of the group receiving communications only from the second communications system. Methods of intelligent arbitration are well known.

In FIG. 7, the multi-parameter light fixtures 620, 622, 624, 626, 628, 630 and 632 are all connected to the second communications system. The light fixtures are set with an operating address. Light fixtures 620, 622, 624 and 626 are connected and capable of receiving communications over the first communications system. All light fixtures are free to communicate over the second communications system, although normally operational commands are communicated from the controller 610 to the light fixtures 620, 622, 624 and 626 on the first communications system. Upon system power up, the multi-parameter light fixtures 620, 622, 624 and 626 on the first communications system communicate amongst themselves on a peer-to-peer basis preferably using a set of rules to avoid collisions during communications. A suitable set of rules is the CSMA/CD (Carrier Sense Multiple Access/Collision Detection) protocol. CSMA/CD is a set of rules determining how network devices respond when two devices attempt to use a data channel simultaneously, which is called a collision. CSMA/CD is well known and commonly used in standard Ethernet networks. The IEEE 802.11 standard specifies a carrier sense multiple access with collision avoidance (CSMA/CA) protocol. In this protocol, when a node receives a packet to be transmitted, it first listens to ensure no other node is transmitting. If the channel is clear, it then transmits the packet. Otherwise, it chooses a random "backoff factor" which determines the amount of time the node must wait until it is allowed to transmit its packet. During periods in which the channel is clear, the transmitting node decrements its backoff counter. When the channel is busy it does not decrement its backoff counter. When the backoff counter reaches zero, the node transmits the packet. Since the probability that two nodes will choose the same backoff factor is small, collisions between packets are minimized. This standard enables devices to detect a collision. The multi-parameter light fixtures 620, 622, 624 and 626 establish a hierarchy amongst themselves in any suitable way, such as, for example, by using the operating addresses or the manufacturing addresses assigned to them.

If the first communications system is not capable of bi-directional communications, as is the case with the present DMX512 protocol, or as an alternative, a hierarchy may be established using the second communications system if it is bi-directional. In this event, the multi-parameter light fixtures 620, 622, 624, 626, 628, 630 and 632 communicate using peer-to-peer communications over the second communications system. By communicating amongst themselves on the second communications system, the light fixtures 620, 622, 624, 626, 628, 630 and 632 determine which amongst them both has the highest manufacturing address (or, alternatively, operating address) and also receives valid communications from the first communications system. The light fixture having the highest manufacturing address (alternatively, the lowest or any other numeric ranking would also be suitable) and receiving valid communications through the first communications system, for is selected to automatically retransmit the required operating command set from the first communications system to multi-parameter light fixtures 620, 622, 624, 626, 628, 630 and 632 on the second communications system. Light fixtures 628, 630 and 632 which are not on the first communications system are thereby able to receive the command set on the first communications system through the multi-parameter light fixture selected as the gateway.

The presence of two (or more) separately controlled communications systems permits command sets to be communicated on one while the second communications system is used for additional functions such as transmitting service information, running diagnostics, transmitting operating temperatures, updating operating code, perform manufacturer quality control, and so forth. In this manner, data traffic on the first communications system is reduced and the load shared by the second communications system.

The presence of two or more separately controlled communications systems also provides redundancy, which may be used to increase reliability. For example, if the light fixtures 620, 622, 624, 626, 628, 630 and 632 are all working on an automatic priority system and light fixtures 620, 622, 624 and 626 are not receiving information from the advanced controller 610 over the first communications system, they may operate from commands provided by the computer 640 over the second communications system.

The presence of two or more separately controlled communications systems also enables lighting systems to be adapted to a number of special circumstances. A lighting system in which the first communications system is DMX-based and the second communications system is power line bi-directional is particularly useful, for example, for reducing labor required to position light fixtures in hard to reach locations. The higher reliability system is the hardwired DMX system, as power line systems are still subject to interference. However, the power line system is capable of bi-directional communications, and is useful for reporting service conditions of the light fixtures and for handling arbitration using CSMA/CD if CEBus is used as the power line protocol. In one illustrative arrangement, all of the light fixtures are on the power line system while only some of the light fixtures are on the DMX system. The DMX system carries commands to operate all of the light fixtures in the lighting system, so that the light fixtures on the DMX system receive their commands directly while light fixtures on the power line system receive their commands through one of the light fixtures on the DMX system acting as a gateway to the power line system. All fixtures are responsive to the power line system for service information, since they are all connected to the power line. The second communications system may instead be an RF or infrared system, if desired.

As a second example, a lighting system in which the first communications system uses a bi-directional protocol that is a successor to the DMX protocol and the second communications system uses the DMX protocol is particularly useful, for example, for facilitating a smooth transition from the old DMX protocol to its successor. A multi-parameter light fixture on the communications system using the successor protocol acts as a gateway to older lights on the communications system using the older protocol, and both new and old controllers would be supported. The present DMX protocol specifies three wires: (1) data plus; (2) data negative; and (3) ground. Receivers are receivers only and transmitters are transmitters only. It is likely that a new standard protocol to replace DMX will be conceived in the future that will allow bi-directional communications over the same set of wires or even a coaxial cable. The present DMX standard does specify the addition of two more wires, a data plus and data negative, to achieve bi-directional full duplex, but the 5-wire full duplex system has not been readily accepted and is not in widespread use.

As a third example, a lighting system in which the first communications system uses a bi-directional protocol for video projection lights, such as, for example, the Ethernet protocol or a new high speed bi-directional protocol, and the second communications system uses the DMX protocol or its successor is particularly useful, for example, to enable the use of both advanced video projection light fixtures and the simpler and older light fixtures. The fast Ethernet or new protocol may contain information for the simpler and older light fixtures, and an advanced video projection light fixtures may act as a gateway to send DMX protocol commands to the light fixtures on the DMX system.

It will be appreciated that the lighting systems of the second and third examples may be provided with a third communications system that uses the power line protocol to make installation more convenient or for other reasons.

Figure 8:
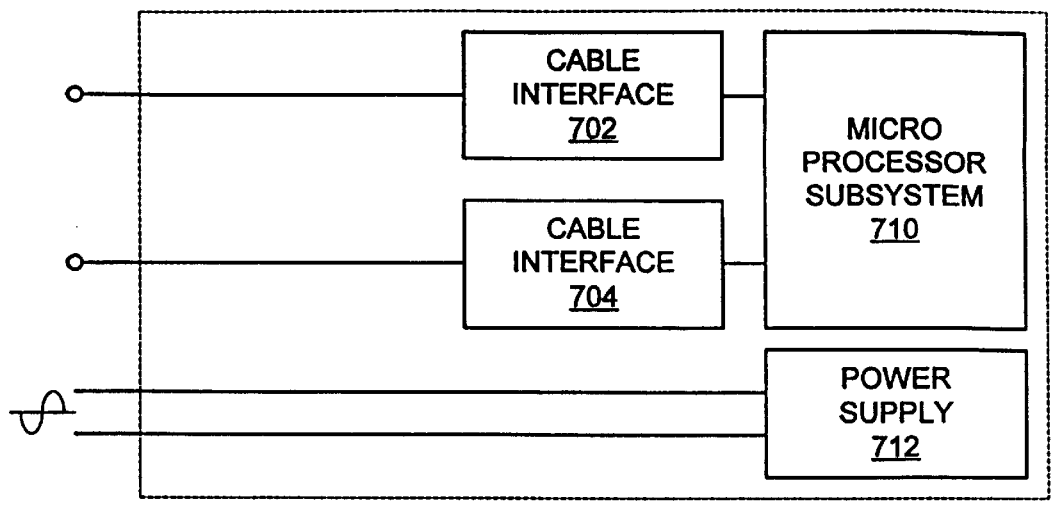
FIGS. 8, 9 and 10 are block schematic diagrams showing various arrangements of communications systems interfaces, in accordance with the present invention.
Figure 9:
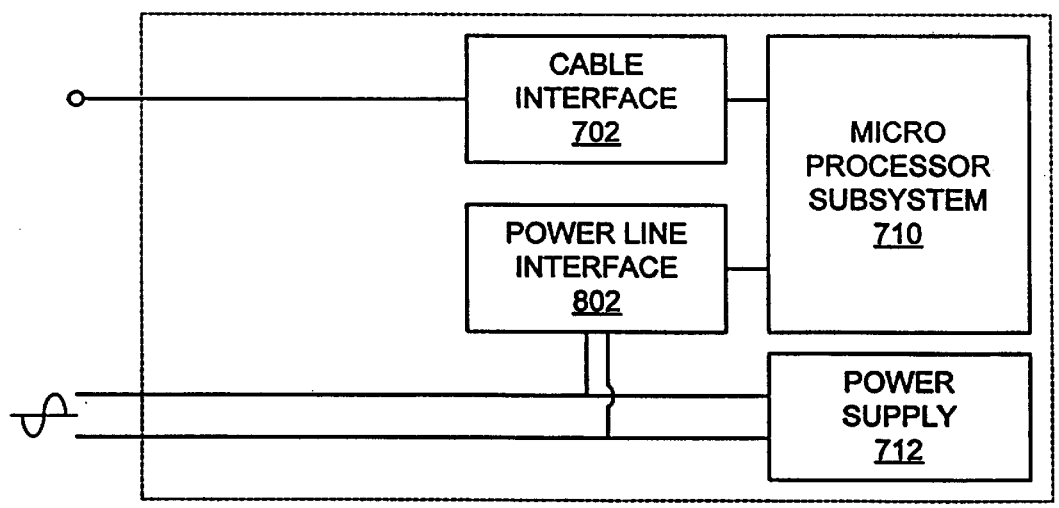
Figure 10:
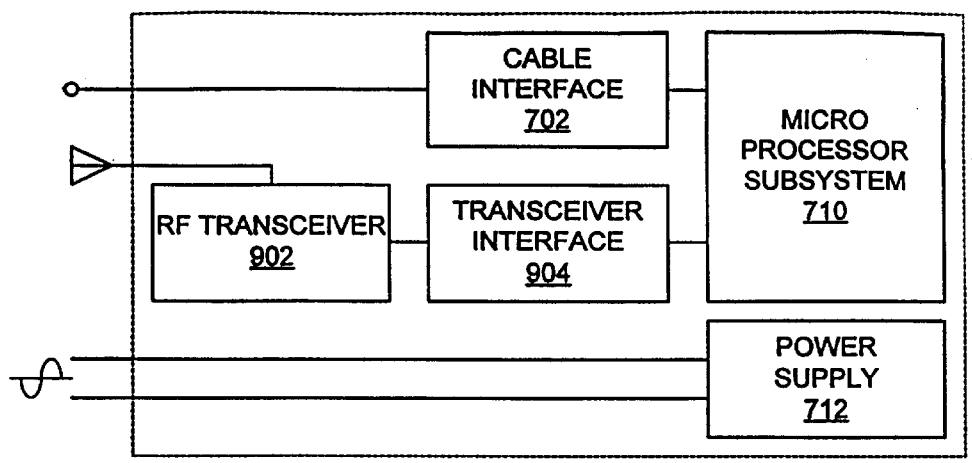

The digital circuits of three two-channel multi-parameter light fixtures are shown in FIG. 8 through FIG. 10; it will be appreciated that more than two channels to support more than two communications systems may be provided if desired. As these types of circuits are generally well known in the art, they have been simplified for clarity to show the arrangement of communications system interfaces relative to the microprocessor and the device terminals. Suitable circuits are available from various manufacturers, including National Semiconductor, Inc. of Santa Clara, Calif., and Intellon Corporation of Ocala, Fla.

FIG. 8 shows an arrangement suitable for a multi-parameter light system having two cable communications systems. The microprocessor sub-system 710 interfaces to the first cable communications system through a cable interface circuit 702, and interfaces to the second cable communications system through a cable interface circuit 704. A power supply 712 is also shown.

FIG. 9 shows an arrangement suitable for a multi-parameter light system having one cable communications systems routed to only some of the multi-parameter light fixtures but requiring communications to all of the multi-parameter light fixtures. The second communications system is implemented through the power line. The microprocessor sub-system 710 interfaces to the first cable communications system through the cable interface circuit 702, and interfaces to a power line to the power supply 712 through a power line interface circuit 802.

FIG. 10 shows an arrangement suitable for a multi-parameter light system having one cable communications systems routed to only some of the multi-parameter light fixtures but requiring communications to all of the multi-parameter light fixtures. The second communications system is implemented wirelessly through, for example, radio frequency communications. The microprocessor sub-system 710 interfaces to the first cable communications system through the cable interface circuit 702, and interfaces to a radio frequency transceiver 902, which is connected to an antenna 900, through a transceiver interface 904.

Figure 11:
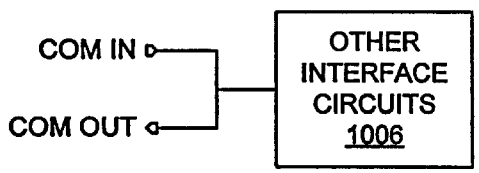
FIGS. 11, 12, 13 and 14 are block schematic diagrams showing various terminal arrangements.
Figure 12:
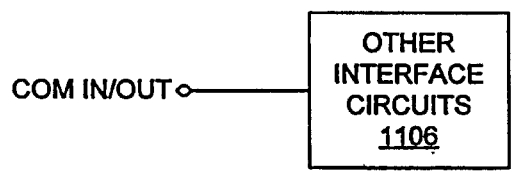
Figure 13:
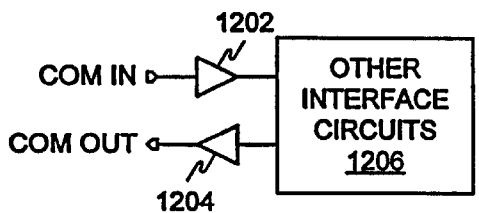
Figure 14:
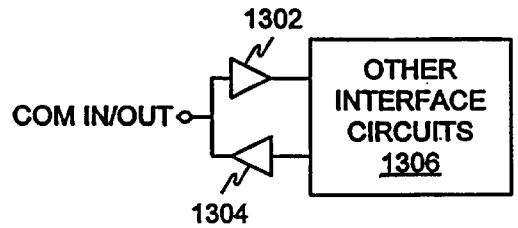

While the terminals in FIGS. 8 through 10 are shown as single ended for clarity, it will be appreciated that the terminals are representative of the numerous terminal arrangements well known in the art, including unidirectional and bidirectional ports as well as various arrangements of connectors including looped through connectors and connectors that incorporate line amplifiers and pulse shapers. For example, FIG. 11 shows a simple loop-through connector in which one terminal is designated COM IN and the other is designated COM OUT, FIG. 12 shows a bidirectional terminal designated COM IN/OUT, FIG. 13 shows a separate COM IN and COM OUT terminals with respective line drivers/pulse shapers 1202 and 1204, and FIG. 14 shows a bi-directional terminal designated COM IN/OUT connected to an input line driver/pulse shaper 1302 and an output line driver/pulse shaper 1304.

The description of the invention and its applications as set forth herein is illustrative and is not intended to limit the scope of the invention as set forth in the following claims. Variations and modifications of the embodiments disclosed herein are possible, and practical alternatives to and equivalents of the various elements of the embodiments are known to those of ordinary skill in the art. These and other variations and modifications of the embodiments disclosed herein may be made without departing from the scope and spirit of the invention as set forth in the following claims.

What is claimed is:

1. A multi-parameter light fixture comprising:
   a lamp assembly comprising a plurality of parameters;
   an addressable first digital communications node networkable in a first external communications system and having a first control output coupled to the lamp assembly for controlling at least one of the parameters; and
   an addressable second digital communications node networkable in a second external communications system and having a second control output coupled to the lamp assembly for controlling at least one of the parameters.

2. A multi-parameter light fixture as in claim 1, wherein at least one of the first and second communications nodes supports bidirectional digital communications.

3. A multi-parameter light fixture as in claim 1, wherein the first and second digital communications nodes are compliant with different communications protocols.

4. A multi-parameter light fixture as in claim 1, wherein at least one of the first and second digital communications nodes is compliant with a DMX protocol.

5. A multi-parameter light fixture as in claim 1, wherein at least one of the first and second digital communications nodes is compliant with a protocol that supports video information.

6. A multi-parameter light fixture as in claim 1, wherein at least one of the first and second digital communications nodes is compliant with a protocol that supports pixel information.

7. A multi-parameter light fixture as in claim 1 wherein:
   the parameters include a lamp on parameter, a color change command, a position parameter, a dimmer parameter, an image rotate parameter, and an image projection parameter; and
   the first control output controls a first group of the parameters and the second control output controls a second group of the parameters.

8. A multi-parameter light fixture as claimed in claim 1 wherein:
   the parameters include an image projection parameter; and
   the first control output does not control the image projection parameter; and
   the second control output controls the image projection parameter.

9. A multi-parameter light fixture comprising:
   a lamp assembly comprising a plurality of parameters, including a video projection parameter;
   an addressable first digital communications node networkable in a DMX communications system and having a control output coupled to the lamp assembly for controlling at least one of the parameters; and
   an addressable second digital communications node networkable in a second external communications system that is compliant with a protocol that supports video information, the second digital communications node having a control output coupled to the lamp assembly for controlling at least the video projection parameter.

* * * * *